(12) United States Patent
Jeon et al.

(10) Patent No.: US 11,673,568 B2
(45) Date of Patent: Jun. 13, 2023

(54) HYBRID ELECTRIC VEHICLE AND ENGINE START INFORMATION DISPLAY METHOD THEREFOR

(71) Applicants: Hyundai Motor Company, Seoul (KR); Kia Motors Corporation, Seoul (KR)

(72) Inventors: Sung Bae Jeon, Ansan-Si (KR); Jae Ho Lee, Seongnam-si (KR); Song Il Park, Seongnam-si (KR); Sung Jae Oh, Goyang-si (KR); Hui Un Son, Suwon-si (KR); Min Gyu Heo, Cheonan-si (KR); Jin Kyeom Cho, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 337 days.

(21) Appl. No.: 17/092,724

(22) Filed: Nov. 9, 2020

(65) Prior Publication Data

US 2021/0179129 A1 Jun. 17, 2021

(30) Foreign Application Priority Data

Dec. 16, 2019 (KR) .......................... 10-2019-0168120

(51) Int. Cl.
*B60W 50/14* (2020.01)
*B60K 35/00* (2006.01)
*B60W 50/00* (2006.01)

(52) U.S. Cl.
CPC .............. *B60W 50/14* (2013.01); *B60K 35/00* (2013.01); *B60K 2370/152* (2019.05);
(Continued)

(58) Field of Classification Search
CPC ......... B60W 50/14; B60W 2050/0093; B60W 2050/146; B60K 35/00; B60K 2370/152; B60K 2370/167
See application file for complete search history.

(56) References Cited

U.S. PATENT DOCUMENTS

| 2010/0049389 A1* | 2/2010 | Ando | ................... | G07C 5/0825 |
| | | | | 180/65.265 |
| 2011/0095878 A1* | 4/2011 | Skaff | ..................... | B60K 35/00 |
| | | | | 340/441 |

(Continued)

OTHER PUBLICATIONS

"Rule-corrected energy management strategy for hybrid electric vehicles based on operation-mode prediction" Y. Liu et al; Journal of Cleaner Production 188 (2018) 796-806 (Year: 2018).*

(Continued)

*Primary Examiner* — Peter D Nolan
*Assistant Examiner* — Tanya C Sienko
(74) *Attorney, Agent, or Firm* — Slater Matsil, LLP

(57) ABSTRACT

A method for providing engine start information for a hybrid electric vehicle includes determining a likelihood of engine start for each of a plurality of reasons for engine start, and displaying a reason for engine start having a highest likelihood of engine start from among the plurality of reasons for engine start and engine start information including the highest likelihood of engine start in consideration of a type of at least one reason for engine start and a level of the likelihood of engine start.

20 Claims, 5 Drawing Sheets

(52) U.S. Cl.
CPC .................. *B60K 2370/167* (2019.05); *B60W 2050/0093* (2013.01); *B60W 2050/146* (2013.01)

(56) References Cited

U.S. PATENT DOCUMENTS

| | | | |
|---|---|---|---|
| 2011/0202210 A1* | 8/2011 | Goda | B60L 50/16 |
| | | | 903/930 |
| 2012/0188068 A1* | 7/2012 | Hanna | B60W 10/26 |
| | | | 340/455 |
| 2015/0211468 A1* | 7/2015 | Ezumi | F02N 11/0818 |
| | | | 701/112 |
| 2016/0023646 A1* | 1/2016 | Nedorezov | B60K 6/387 |
| | | | 180/65.265 |
| 2016/0304086 A1* | 10/2016 | Mansour | F02N 11/0862 |
| 2017/0274890 A1* | 9/2017 | Mansur | B60W 20/13 |
| 2017/0274910 A1* | 9/2017 | Ishibashi | B60K 6/445 |
| 2021/0129678 A1* | 5/2021 | Barker | B60W 20/00 |

OTHER PUBLICATIONS

"Study on Engine Start-Stop Control Strategy for Series-Parallel Hybrid Vehicle", H. Wang etc. Proceedings of 2015 IEEE International Conference on Mechatronics and Automation, Aug. 2-5, Beijing, China (Year: 2015).*

* cited by examiner

HYBRID ELECTRIC VEHICLE AND ENGINE START INFORMATION DISPLAY METHOD THEREFOR

CROSS-REFERENCE TO RELATED APPLICATIONS

This application claims the benefit of Korean Application No. 10-2019-0168120, filed on Dec. 16, 2019, which application is hereby incorporated herein by reference.

TECHNICAL FIELD

The present invention relates to a hybrid electric vehicle and an engine start information display method therefor.

BACKGROUND

A hybrid electric vehicle (HEV) is a vehicle using two power sources, in general, and the two power sources are mainly an engine and an electric motor. Such hybrid electric vehicles have higher fuel efficiency and dynamic performance than vehicles including only an internal combustion engine and are advantageous for exhaust gas reduction and thus have recently been widely developed.

SUMMARY

The present invention relates to a hybrid electric vehicle and an engine start information display method therefor. Particular embodiments relate to a hybrid electric vehicle and an engine start information display method therefor for notifying a driver of a reason for engine start and an engine start time.

An embodiment of the present invention provides a hybrid electric vehicle and an engine start information display method therefor for notifying a driver whether to start an engine in advance when engine starting is required while a hybrid electric vehicle is traveling.

It will be appreciated by persons skilled in the art that the objects that could be achieved with embodiments of the present invention are not limited to what has been particularly described hereinabove and the above and other objects that embodiments of the present invention could achieve will be more clearly understood from the following detailed description.

An engine start information providing method for a hybrid electric vehicle according to an embodiment of the present invention may include determining likelihood of engine start for each of a plurality of reasons for engine start, and displaying a reason for engine start having highest likelihood of engine start from among the plurality of reasons for engine start and engine start information including the highest likelihood of engine start in consideration of a type of at least one reason for engine start and a level of the likelihood of engine start.

In another embodiment of the present invention, a hybrid electric vehicle may include a hybrid control unit for determining likelihood of engine start for each of a plurality of reasons for engine start and determining a reason for engine start having highest likelihood of engine start from among the plurality of reasons for engine start and engine start information including the highest likelihood of engine start in consideration of a type of at least one reason for engine start and a level of the likelihood of engine start, and a display for displaying the engine start information.

The hybrid electric vehicle according to at least one embodiment of the present invention configured as above can determine whether an engine needs to be started and an engine start time and notify a driver of the determination result in advance to prevent the driver from feeling uncomfortable.

It will be appreciated by persons skilled in the art that the effects that can be achieved with the present invention are not limited to what has been particularly described hereinabove and other advantages of the present invention will be more clearly understood from the following detailed description.

DETAILED DESCRIPTION OF ILLUSTRATIVE EMBODIMENTS

Figure 1:
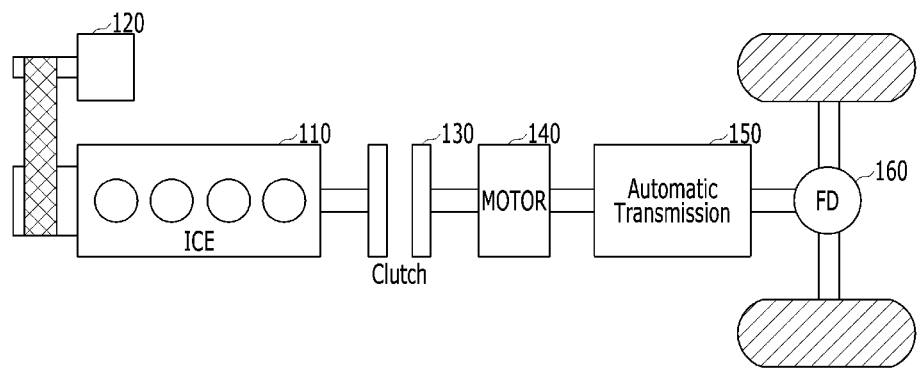
FIG. 1 illustrates an example of a powertrain structure of a hybrid electric vehicle.

The detailed description of the exemplary embodiments of the present invention will be given to enable those skilled in the art to implement and practice the invention with reference to the attached drawings. However, the present invention can be implemented in various different forms and is not limited to embodiments described herein. In addition, parts that are not related to the description will be omitted for clear description in the drawings, and the same reference numbers will be used throughout this specification to refer to the same or like parts.

Throughout the specification, when it is said that some part "includes" a specific element, this means that the part may further include other elements, not excluding the same, unless mentioned otherwise. In addition, parts denoted by the same reference numeral refer to the same component throughout the specification.

An embodiment of the present invention proposes a method of monitoring whether an engine needs to be started in a hybrid electric vehicle and outputting at least an expected starting time or the reason for engine starting as information in a predetermined form as necessary.

FIG. 1 illustrates an example of a powertrain structure of a hybrid electric vehicle.

FIG. 1 illustrates a powertrain of a hybrid electric vehicle employing a parallel type hybrid system in which an electric motor (or a drive motor) 140 and an engine clutch 130 are provided between an internal combustion engine (ICE) 110 and a transmission 150.

In this vehicle, when a driver depresses an accelerator pedal after starting (i.e., accelerator pedal sensor is turned on), the motor 140 operates using battery power in a state in which the engine clutch 130 is opened and the power of the motor is transmitted to the transmission 150 and a final drive (FD) 160 to move wheels (i.e., EV mode). When the vehicle requires higher driving power due to gradually increasing speed, an auxiliary motor (or starter generator 120) can operate to drive the engine 110.

When the rotation speed of the engine 110 becomes identical to the rotation speed of the motor 140, the engine clutch 130 is engaged to drive the vehicle along with the engine 11o and the motor 140 (i.e., transition from the EV mode to an HEV mode). When predetermined engine off conditions including vehicle speed reduction are satisfied, the engine clutch 130 is opened and the engine 110 stops (i.e., transition from the HEV mode to the EV mode). Here, the vehicle charges a battery through the motor 140 using the driving power of the wheels, which is referred to as braking energy regeneration or regenerative braking. Accordingly, the starter generator 120 serves as a starter motor when the engine is started and serves as a generator after the engine is started or rotation energy of the engine is recovered when the engine is turned off, and thus may be referred to as a hybrid starter generator (HSG).

In general, a stepped transmission or a multi-plate clutch, for example, a dual-clutch transmission (DCT), may be used as the transmission 150.

Such a hybrid electric vehicle can travel in two driving modes according to which powertrain is driven. One of the two driving modes is an electric vehicle (EV) mode in which the engine clutch 130 is opened and driving is performed using only the motor 140 and the other mode is a hybrid electric vehicle (HEV) mode in which the motor and the engine 110 are operated together. Hybrid electric vehicles switch between the two modes depending on driving conditions. Here, the HEV mode may be divided into a series mode and a parallel mode.

The series mode refers to a mode in which the engine clutch 130 is opened, the HSG 120 generates power using the power of the engine 110, and the motor 140 is driven with the generated power. The parallel mode refers to a mode in which the engine clutch 130 is locked such that the engine 110 and the motor 140 distribute power to drive the vehicle.

That is, in hybrid electric vehicles, the engine 110 may be started for power generation even in a case where actual driving power is obtained from the motor 140 as in the series mode as well as being started in a case where high power is required as in the parallel mode. Further, the engine 110 may be started for various reasons such as temperature conditions and the purpose of learning a controller in situations other than the parallel mode. However, when the engine 110 is started in unexpected situations, general drivers who know that the engine 110 is used only during driving at high speeds may misrecognize engine start as engine failure or feel uncomfortable.

Figure 2:
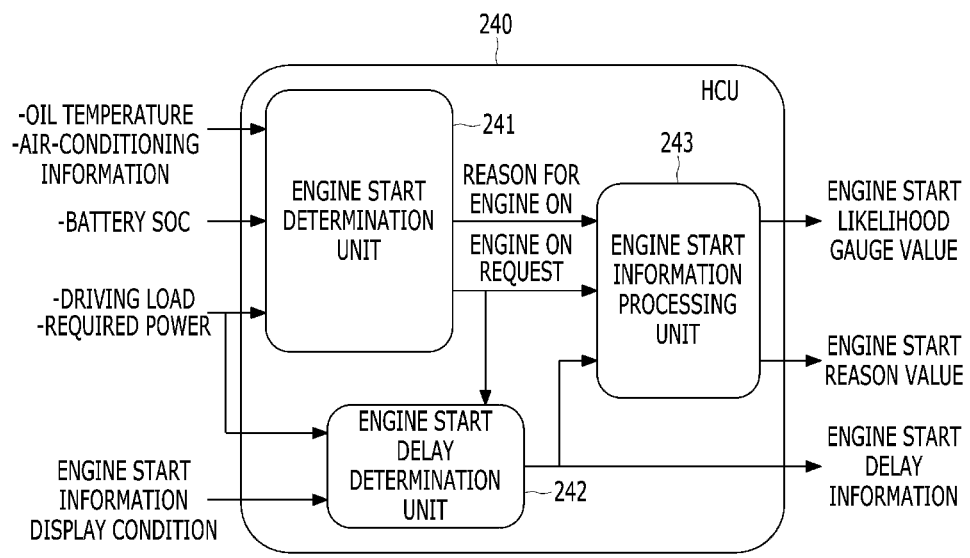
FIG. 2 illustrates an example of a hybrid control unit configuration according to an embodiment of the present invention.

FIG. 2 illustrates an example of a hybrid control unit configuration according to an embodiment of the present invention.

Referring to FIG. 2, a hybrid control unit 240 according to an embodiment may have, as input values, information for determining the reason (cause) for engine starting and engine start information display conditions for determining whether to display engine start information. Although the information for determining the reason for engine starting may include oil temperature, air-conditioning information, a state of charge (SOC) of a battery, driving load, required power, and the like, these are exemplary and the present invention is not limited thereto, and the information may be any factor affecting engine starting.

Information on temperatures of various oils including an engine oil and coolant temperature may be acquired from an engine management system (EMS) for controlling an engine, and the air-conditioning information may be acquired from an air-conditioning control (e.g., full automatic temperature control (FATC)) unit. Further, the driving load or required power may be calculated in the hybrid control unit 240 on the basis of an accelerator pedal position sensor (APS) value, and a driving mode (comfort, normal, sport, etc.). Information on battery SOC may be acquired from a battery management system (BMS) and may include information about SOC of a high-voltage main battery and SOC of an auxiliary battery.

Further, the hybrid control unit 240 may have, as output values, information about the likelihood of the engine starting (e.g., a gauge value), information about a reason for the engine starting, information about a delay of the engine starting, etc.

Meanwhile, the hybrid control unit 240 may include an engine start determination unit 241 for determining whether the engine needs to be started on the basis of at least some of the input information, an engine start delay determination unit 242 for determining whether delaying engine start is possible in order to secure a time to notify a driver of engine start when engine start is requested by the engine start determination unit 241, and an engine start information processing unit 243 for determining whether to display engine start information and an engine start information display form.

Hereinafter, the function of each component of the hybrid control unit 240 will be described in more detail.

First, the engine start information processing unit 243 determines whether to display engine start information and an engine start information display form, as described above, and the engine start information may include information about likelihood of engine start and information about a reason for engine start. Accordingly, the engine start information processing unit 243 can determine the likelihood of engine start for each reason through monitoring of various factors that are causes of engine start. The information about a reason for engine start may correspond to a factor having the highest likelihood of engine start.

The likelihood of engine start may be calculated through different methods according to a condition in which quantitative criteria are present and a condition in which only a single criterion of on/off is present.

For example, in the case of a condition having quantitative criteria such as temperature and SOC, the likelihood of engine start may be determined by the following Mathematical expression 1.

[Mathematial expression 1]

$$\text{Likelihood of engine start (\%)} = \begin{cases} \dfrac{X_{now} - \text{Off}_{threshold}}{On_{threshold} - \text{Off}_{threshold}} \times 100 & \left(\text{if } On_{threshold} > \text{Off}_{threshold}\right) \\ \dfrac{\text{Off}_{threshold} - X_{now}}{\text{Off}_{threshold} - On_{threshold}} \times 100 & \left(\text{if } On_{threshold} < \text{Off}_{threshold}\right) \end{cases}$$

In Mathematical expression 1, $X_{now}$ represents a current value of a specific factor, $\text{Off}_{threshold}$ represents an OFF threshold value and $On_{threshold}$ represents an ON threshold value. According to Mathematical expression 1, the likelihood of engine start can be determined by ratios of the current value to the determined OFF reference value and ON reference value.

On the other hand, in a case where a single on/off criterion, such as a failure state, a diagnosis/test mode, or entering learning is present, only 0% and 100% are present when the method as represented by Mathematical expression 1 is applied, and thus 100% is immediately obtained when the engine start determination unit 241 outputs an engine on request. Accordingly, preventing the driver from being surprised is difficult. To alleviate this, a method of gradually increasing a gauge from 0% to 100% in a time that can be delayed depending on a determination result of the engine start delay determination unit 242 or a predetermined minimum reference time for a factor for which only the single on/off criterion is present is proposed. When this method is used, the likelihood of engine start can be determined by the following mathematical expression 2.

[Mathematial expression 2]

$$\text{Likelihood of engine start (\%)} = \begin{cases} \frac{t_{now}}{t_{delayed}} \times 100 & \left(\begin{array}{l}\text{if engine start}\\ \text{can be delayed}\end{array}\right) \\ \frac{t_{now}}{t_{Min}} \times 100 & \left(\begin{array}{l}\text{if engine start}\\ \text{cannot be delayed}\end{array}\right) \end{cases}$$

In Mathematical expression 2, $t_{now}$ represents a current elapsed time, $t_{delayed}$ represents a time that can be delayed determined by the engine start delay determination unit 242, and $t_{min}$ represents a predetermined minimum reference time when the engine start delay determination unit 242 determines that engine start cannot be delayed.

According to Mathematical expression 2, the time that can be delayed is 3 seconds, and the likelihood of engine start is 33% when 1 second has elapsed, 66% when another 1 second has additionally elapsed and 100% when 3 seconds have elapsed. Accordingly, the driver can see a gauge increasing from 0% to 100% for 3 seconds.

The engine start delay determination unit 242 can determine whether engine start can be delayed and a delay time for each reason using information about the reasons for engine ON and vehicle driving information received from an engine start requesting unit.

Since engine start delay may prevent the driver from being surprised due to an unexpected engine start when the vehicle is in a stop state, it can be used only when the vehicle stops. This is because the driver feels less uncomfortable and engine start delay may be likely to affect operability/fuel efficiency during driving. Further, engine start delay may be performed only when the driver sets the corresponding function.

Accordingly, the engine start delay determination unit 242 may output a delay determination signal and a delay time as engine start delay information in the case of a reason for engine start delay, such as attempting learning, from among reasons for engine start during vehicle stop.

Further, the engine start delay determination unit 242 may control an output means (a display, a speaker, or the like) such that a notification sound is output or an indicator light flickers in order to additionally notify the driver that the engine will be started upon start of engine start delay.

Further, the engine start delay determination unit 242 may increase a delay time until it is determined that the driver gazes at/checks a position (e.g., cluster) at which engine start information is displayed using eye tracking through an in-cabin camera or perform engine start delay only when the driver checks the position at which the engine start information is displayed. Here, various conditions below may be applied when it is determined whether the driver checks the position. For example, the conditions may include 1) a case where a driver has set an engine start information menu in a display, 2) a case in which the driver has set the engine start information menu in the display and gazes at the display using driver gaze information in the vehicle, 3) a case where the aforementioned engine start delay function start notification sound function is set, etc.

Hereinafter, a configuration and a form of engine start information will be described in more detail with reference to FIGS. 3A to 5.

Figure 3A:
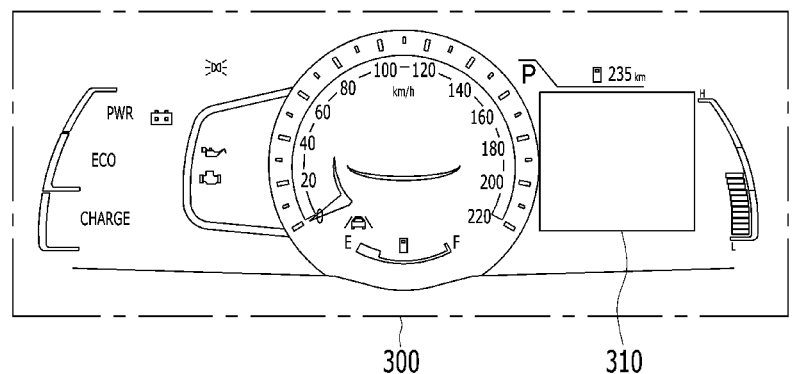
FIG. 3A illustrates an example of an area in which engine start information is displayed according to an embodiment of the present invention and FIG. 3B illustrates an example of an engine start information configuration.
Figure 3B:
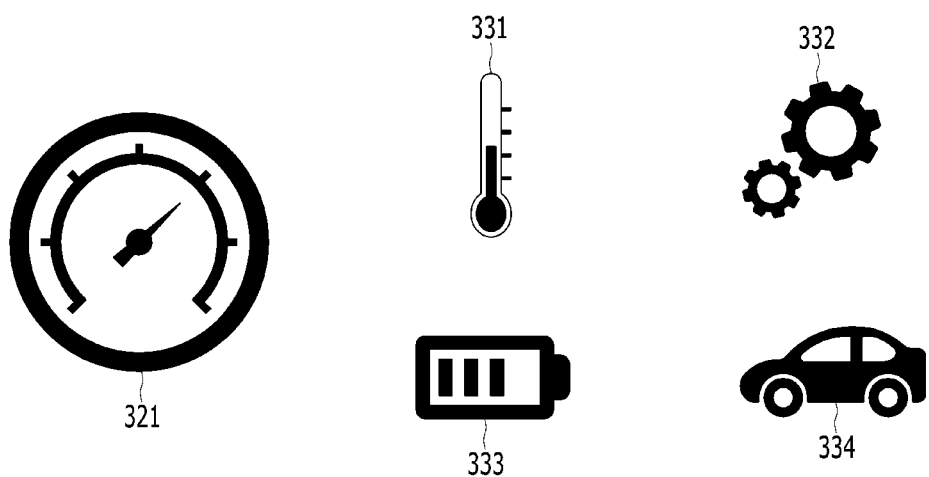

FIG. 3A illustrates an example of an area in which engine start information is displayed according to an embodiment of the present invention and FIG. 3B illustrates an example of an engine start information configuration.

Referring to FIG. 3A, the engine start information may be display through an area 310 in which a display capable of displaying graphics is provided in the cluster 300. However, this is exemplary and the engine start information may be displayed in the form of a segment type gauge and a warning light instead of graphics. Further, the area in which the engine start information is displayed may be displayed through a head-up display (HUD) or a display of a head unit in addition to the cluster.

Referring to FIG. 3B, information on likelihood of engine start may be displayed as a value of a gauge 321, and a reason for engine start may be displayed using a temperature icon 331, a system icon 332, a battery icon 333, or a driving icon 334.

An exemplary reason for each icon is shown in Table 1.

TABLE 1

| Reason | Item |
| --- | --- |
| Driving | Driving mode (sport mode, etc.), sudden acceleration, etc. |
| Battery | Low SOC, auxiliary battery charging, excessive electric equipment load, motor derating, etc. |
| Temperature | Engine preheating, air conditioner, temperature conditions of various fluids, etc. |
| System | Failure state, engine clutch learning, motor learning, diagnosis and test mode, etc. |

These forms/types/corresponding reasons of gauges and icons are exemplary and other configurations may be applied.

FIGS. 4A to 4D illustrate examples of engine start information display forms for situations according to an embodiment of the present invention.

When multiple reasons for engine start are present, a gauge and an icon corresponding to a reason having high likelihood of engine start may be displayed together.

For example, in a case where likelihood of engine start due to insufficient SOC is 60% and likelihood of engine start due to an oil temperature is 80%, the gauge 321 indicating 80% and the temperature icon 331 can be displayed on the basis of the oil temperature having a higher likelihood.

As another example, a case where engine start can be delayed although a reason for engine start is not quantitative, for example, a case where likelihood of engine start due to insufficient SOC is 50% in a situation in which 3 seconds are provided as a delay time although engine start for engine clutch learning is requested, is considered.

Figure 4A:
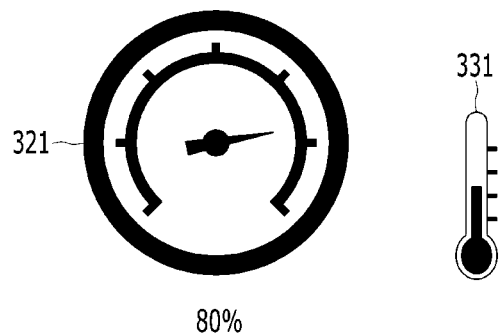
FIGS. 4A to 4D illustrate examples of engine start information display forms for situations according to an embodiment of the present invention.
Figure 4B:
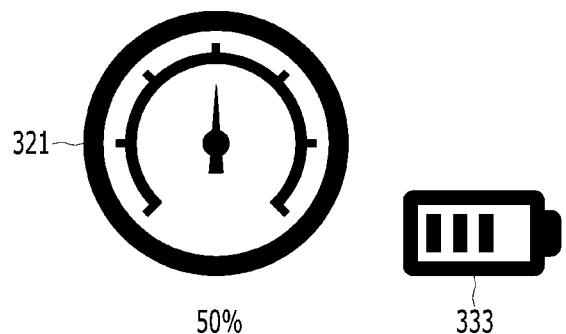

In this case, likelihood of engine start for engine learning is 33% and likelihood of engine start due to insufficient SOC is 50% according to Mathematical expression 2 when 1 second has elapsed. Consequently, according to current highest likelihood of engine start, the gauge 321 indicates 50% and the battery icon 333 is displayed because the reason for engine start is SOC, as shown in FIG. 4B.

Figure 4C:
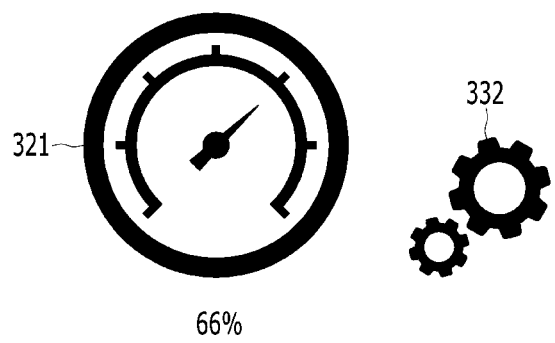

Further, likelihood of engine start for engine learning is 66% and likelihood of engine start due to insufficient SOC is 50% according to Mathematical expression 2 when 2 seconds have elapsed. Consequently, according to current highest likelihood of engine start, the gauge 321 indicates 66% and the system icon 332 is displayed because the reason for engine start is learning, as shown in FIG. 4C.

Figure 4D:
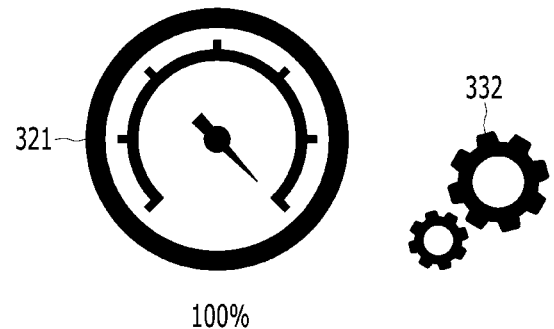

In addition, likelihood of engine start for engine learning is 100% and likelihood of engine start due to insufficient SOC is 50% according to Mathematical expression 2 when 3 seconds have elapsed. Consequently, according to current highest likelihood of engine start, the gauge 321 indicates 100% and the system icon 332 is displayed because the reason for engine start is learning, as shown in FIG. 4D. The engine is started as the gauge 321 reaches 100%.

In the above-described embodiment, a single gauge and a single icon are used for the highest likelihood of engine start. However, the engine start information processing unit 243 may determine a reason for which the likelihood of engine start will be output in consideration of priority at a specific criterion (e.g., less than 30%, or the like). For example, if priority of SOC is higher when a temperature condition is 20% and an SOC condition is 15%, the engine start information may be displayed on the basis of the SOC condition. Importance, potential for change, change speed, change frequency, and the like may be considered for priority, and the present invention is not limited thereto.

According to another embodiment of the present invention, different gauges may be simultaneously used for different reasons. This will be described with reference to FIG. 5.

Figure 5:
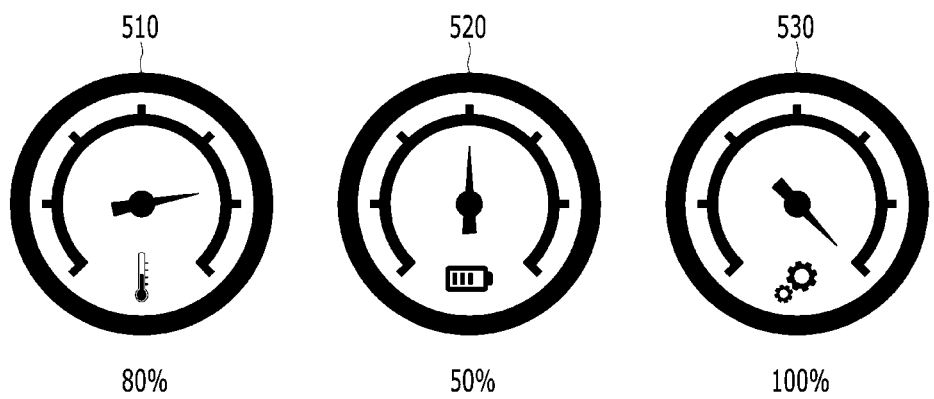
FIG. 5 illustrates another example of an engine start information display form according to an embodiment of the present invention.

FIG. 5 illustrates another example of an engine start information display form according to an embodiment of the present invention.

Referring to FIG. 5, a gauge 510 indicating the likelihood of engine start according to a temperature condition, a gauge 520 indicating the likelihood of engine start according to a battery condition, and a gauge 530 indicating the likelihood of engine start according to a system condition may be simultaneously displayed at all times.

Figure 6:
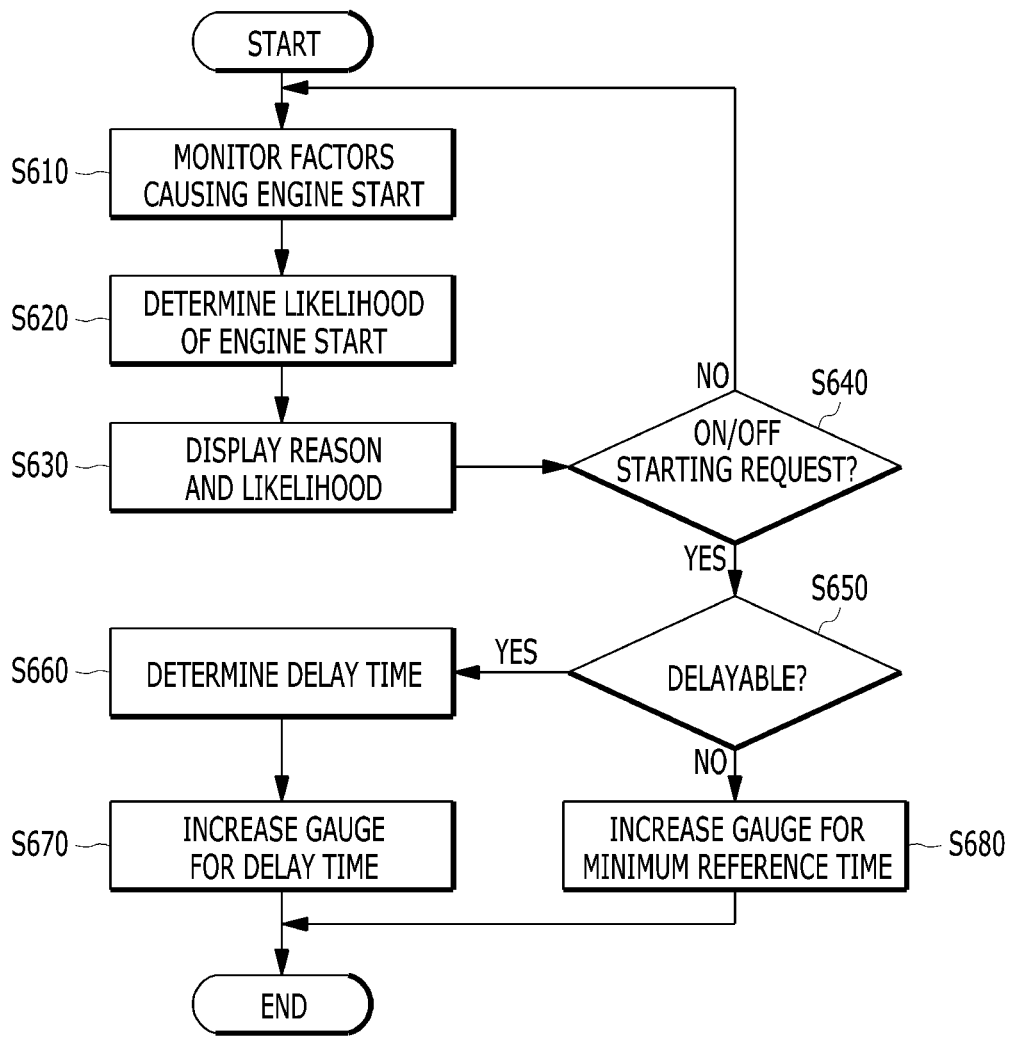
FIG. 6 is a flowchart illustrating an example of an engine start information display process according to an embodiment of the present invention.

The engine start information display process according to the above-described embodiment is arranged as a flowchart in FIG. 6.

FIG. 6 is a flowchart illustrating an example of an engine start information display process according to an embodiment of the present invention.

Referring to FIG. 6, the hybrid control unit 240 may monitor factors that cause engine start, that is, information related to reasons for engine start (S610) and determine the likelihood of engine start for each reason on the basis of the information (S620). Accordingly, the hybrid control unit 240 may display engine start information in a form as described above with reference to FIGS. 3A to 5 on the basis of a reason having a higher likelihood of engine start (S630). Here, engine start information on the basis of predetermined priority may be displayed at specific likelihood or less, as described above.

If engine start due to a reason of on/off type instead of quantitative likelihood determination is requested (Yes in S640), the hybrid control unit 240 may determine whether engine start can be delayed (S650) and determine a delay time (S660) when engine start can be delayed (Yes in S650). Upon determination of the delay time, the hybrid control unit 240 may increase a gauge for the delay time on the basis of an elapsed time with respect to the delay time (S670). When engine start cannot be delayed (No in S650), the hybrid control unit 240 may increase the gauge for a predetermined minimum reference time (S680).

The above-described present invention can be realized as computer-readable code in a medium in which a program is recorded. Computer-readable media include all kinds of recording devices in which data readable by computer systems is stored. Examples of computer-readable media include a hard disk drive (HDD), a solid state drive (SSD), a silicon disk drive (SYD), a ROM, a RAM, a CD-ROM, a magnetic tape, a floppy disk, an optical data storage device, etc.

Therefore, the above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for providing engine start information for a hybrid electric vehicle, the method comprising:
   determining a likelihood of engine start for each of a plurality of reasons for engine start;
   when an engine start request is generated due to a factor having only a single on/off criterion from among the plurality of reasons for engine start, determining a likelihood of engine start delay according to the engine start request;
   determining a delayable time when engine start delay is possible as a result of determining the likelihood of engine start delay; and
   displaying a reason for engine start having a highest likelihood of engine start from among the plurality of reasons for engine start and engine start information including the highest likelihood of engine start in consideration of a type of at least one reason for engine start and a level of the likelihood of engine start, wherein displaying the reason comprises increasing the likelihood of engine start for the reason for engine start having only the single on/off criterion to a maximum value over time for the delayable time.

2. The method according to claim 1, wherein determining the likelihood of engine start delay is performed only when the vehicle stops.

3. The method according to claim 2, wherein determining the likelihood of engine start delay is performed in additional consideration of at least one of whether a driver gazes at a display on which the engine start information is displayed, and user settings with respect to whether the engine start delay is possible.

4. The method according to claim 1, wherein the reason for engine start includes at least one of driving, a battery, a temperature and a system.

5. The method according to claim 1, wherein determining the likelihood of engine start comprises determining the likelihood of engine start based on ratios of a current value to an off threshold value and an on threshold value set for each factor having a quantitative criterion from among the plurality of reasons for engine start.

6. The method according to claim 1, wherein displaying the likelihood of engine start comprises determining the reason for engine start and the likelihood of engine start to be displayed based on a predetermined priority when the highest likelihood of engine start is equal to or less than a predetermined level.

7. A non-transitory computer-readable recording medium storing a program for executing the method for providing engine start information for the hybrid electric vehicle according to claim 1.

8. A hybrid electric vehicle, comprising:
a hybrid control unit configured to determine a likelihood of engine start for each of a plurality of reasons for engine start and determine a reason for engine start having a highest likelihood of engine start from among the plurality of reasons for engine start and engine start information including the highest likelihood of engine start in consideration of a type of at least one reason for engine start and a level of the likelihood of engine start; and
a display configured to display the engine start information;
wherein, when an engine start request is generated due to a factor having only a single on/off criterion from among the plurality of reasons for engine start, the hybrid control unit is configured to determine a likelihood of an engine start delay according to the engine start request; and
wherein the hybrid control unit is configured to determine a delayable time when the engine start delay is possible as a result of the likelihood of the engine start delay and increase the likelihood of engine start for the reason for engine start having only the single on/off criterion to a maximum value over time for the delayable time, or when the engine start delay is impossible as a result of the likelihood of the engine start delay, the hybrid control unit is configured to increase the likelihood of engine start for the reason for engine start having only the single on/off criterion to a maximum value over time for a predetermined minimum reference time.

9. The hybrid electric vehicle according to claim 8, wherein the hybrid control unit is configured to determine the likelihood of engine start delay only when the vehicle stops.

10. The hybrid electric vehicle according to claim 9, wherein the hybrid control unit is configured to determine the likelihood of engine start delay in additional consideration of at least one of whether a driver gazes at a display on which the engine start information is displayed and user settings with respect to whether engine start delay is possible.

11. The hybrid electric vehicle according to claim 8, wherein the reason for engine start includes at least one of driving, a battery, a temperature and a system.

12. The hybrid electric vehicle according to claim 8, wherein the hybrid control unit is configured to determine the likelihood of engine start based on ratios of a current value to an off threshold value and an on threshold value set for each factor having a quantitative criterion from among the plurality of reasons for engine start.

13. The hybrid electric vehicle according to claim 8, wherein the hybrid control unit is configured to determine the reason for engine start and the likelihood of engine start to be displayed based on a predetermined priority when the highest likelihood of engine start is equal to or less than a predetermined level.

14. A method for providing engine start information for a hybrid electric vehicle, the method comprising:
determining a likelihood of engine start for each of a plurality of reasons for engine start; when an engine start request is generated due to a factor having only a single on/off criterion from among the plurality of reasons for engine start, determining a likelihood of engine start delay according to the engine start request;
determining a delayable time when the engine start delay is possible as a result of determining the likelihood of the engine start delay; and
displaying a reason for engine start having a highest likelihood of engine start from among the plurality of reasons for engine start and engine start information including the highest likelihood of engine start in consideration of a type of at least one reason for engine start and a level of the likelihood of engine start, wherein, when the engine start delay is impossible as a result of determining the likelihood of the engine start delay, displaying the reason comprises increasing the likelihood of engine start for the reason for engine start having only the single on/off criterion to a maximum value over time for a predetermined minimum reference time.

15. The method according to claim 14, wherein determining the likelihood of engine start delay is performed only when the vehicle stops.

16. The method according to claim 15, wherein determining the likelihood of engine start delay is performed in additional consideration of at least one of whether a driver gazes at a display on which the engine start information is displayed, and user settings with respect to whether engine start delay is possible.

17. The method according to claim 14, wherein the reason for engine start includes at least one of driving, a battery, a temperature, and a system.

18. The method according to claim 14, wherein determining the likelihood of engine start comprises determining the likelihood of engine start based on ratios of a current value to an off threshold value and an on threshold value set for each factor having a quantitative criterion from among the plurality of reasons for engine start.

19. The method according to claim 14, wherein displaying the likelihood of engine start comprises determining the reason for engine start and the likelihood of engine start to be displayed based on a predetermined priority when the highest likelihood of engine start is equal to or less than a predetermined level.

20. A non-transitory computer-readable recording medium storing a program for executing the method for providing engine start information for the hybrid electric vehicle according to claim 14.

* * * * *